United States Patent
Fu et al.

(10) Patent No.: US 8,527,442 B2
(45) Date of Patent: Sep. 3, 2013

(54) METHOD FOR PREDICTING CITATION COUNTS

(76) Inventors: Lawrence Fu, Alhambra, CA (US); Constantin Aliferis, New York, NY (US)

( * ) Notice: Subject to any disclaimer, the term of this patent is extended or adjusted under 35 U.S.C. 154(b) by 838 days.

(21) Appl. No.: 12/289,970

(22) Filed: Nov. 7, 2008

(65) Prior Publication Data

US 2009/0157585 A1 Jun. 18, 2009

Related U.S. Application Data

(63) Continuation-in-part of application No. 12/195,062, filed on Aug. 20, 2008, now Pat. No. 8,275,772, which is a continuation-in-part of application No. 11/129,388, filed on May 16, 2005, now Pat. No. 7,529,737.

(60) Provisional application No. 60/570,879, filed on May 14, 2004.

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 6,059,835 A | 5/2000 | Bose | |
| 6,128,608 A | 10/2000 | Barnhill | |
| 6,263,328 B1 | 7/2001 | Coden et al. | |
| 6,446,061 B1 | 9/2002 | Doerre et al. | |
| 6,789,069 B1 | 9/2004 | Barnhill | |
| 6,976,207 B1 * | 12/2005 | Rujan et al. | 715/234 |
| 7,117,185 B1 * | 10/2006 | Aliferis et al. | 706/12 |
| 7,240,038 B2 | 7/2007 | Hitt | |
| 7,480,640 B1 * | 1/2009 | Elad et al. | 706/14 |
| 2001/0049706 A1 | 12/2001 | Thorne | |
| 2002/0007285 A1 | 1/2002 | Rappaport | |
| 2002/0029208 A1 | 3/2002 | Josephson | |
| 2004/0078211 A1 | 4/2004 | Schramm-Apple et al. | |
| 2004/0153186 A1 | 8/2004 | Khurana | |
| 2005/0086078 A1 * | 4/2005 | Maloney et al. | 705/2 |
| 2005/0120006 A1 | 6/2005 | Nye | |
| 2005/0154686 A1 | 7/2005 | Corston | |

(Continued)

OTHER PUBLICATIONS

W. Glanzel; On the Possibility and Reliability of Predictions Based on Stochastic Citation Processes; 1997; Jointly published by Elsevier Science Ltd, Oxford and Akaddmiai Kiadr, Budapest; Scientometrics, vol. 40, No. 3 (1997) pp. 481-492.*

(Continued)

*Primary Examiner* — Kakali Chaki
*Assistant Examiner* — Luis Sitiriche
(74) *Attorney, Agent, or Firm* — Laurence Weinberger

(57) ABSTRACT

A computerized process to predict citation counts of articles using only information available before or at the time of publication. The process involves obtaining a set of articles and extracting a set of features containing information about the article, author, and bibliometric data. The extracted features are converted into a format suitable for analysis, and models are constructed using a pattern recognition process. The constructed models are applied to a related article that was not included in the original article set for model construction. Features are extracted from the article of interest, and the models provide a prediction of whether a given number of citations will be received by the article.

28 Claims, 6 Drawing Sheets

(56) References Cited

U.S. PATENT DOCUMENTS

| | | |
|---|---|---|
| 2005/0228783 A1 | 10/2005 | Shanahan |
| 2007/0239638 A1 | 10/2007 | Zhuang |
| 2007/0294223 A1 | 12/2007 | Gabrilovich |

OTHER PUBLICATIONS

Y. Aphinyanaphongs, et al., "Text Categorization Models for Retrieval of High Quality Articles in Internal Medicine."

Gábor Csárdi; "Dyanmics of Citation Networks"; ICANN; 2006; pp. 698-709.

Lokker et al.; "Prediction of Citatoin Counts for Clincal Articles at Two Years Using Data Available Within Three Weeks of Publication: Retrospective Cohort Study"; BMJ; Feb. 21, 2008; pp. 1-6.

Manjunatha et al.; "Citation Prediction Using Time Series Approach KDD Cup 2003 (Task 1)"; SIGKDD Eplorations; vol. 5; No. 2; pp. 152-153.

Castillo et al.; "Estimating Numbre of Citations Using Author Reputation"; pp. 1-10.

\* cited by examiner

METHOD FOR PREDICTING CITATION COUNTS

CROSS-REFERENCE TO RELATED APPLICATIONS

This application is a continuation in part of the application Ser. No. 12/195,062 filed Aug. 20, 2008 now U.S. Pat. No. 8,275,772 the entire disclosure of which is incorporated herein by reference. Application Ser. No. 12/195,062 is a continuation in part of the application Ser. No. 11/129,388 filed May 16, 2005 now U.S. Pat. No. 7,529,737, the entire disclosure of which is incorporated herein by reference. Application Ser. No. 11/129,138 claims the benefit of U.S. Provisional Appl. No. 60/570,879 filed May 14, 2004, the entire disclosure of which is incorporated herein by reference.

BACKGROUND OF THE INVENTION

The most popular method for evaluating the impact and quality of an article is the citation count, which is the number of citations received by an article within a pre-specified time horizon. One limitation of citation count is its unavailability before this horizon expires (typically several years after publication). This delay renders citation counts primarily useful for historical assessment of the scientific contribution and impact of papers. Automatic prediction of citation counts could provide a powerful new method for evaluating articles. Faster identification of promising articles could accelerate research and dissemination of new knowledge.

Accurate models for citation count prediction could also improve our understanding of the factors that influence citations. Predicting and understanding article citation counts is however a challenging problem both on theoretical grounds and on the basis of several decades of related empirical work. In fact, the bulk of the literature concerning citation counts addresses the motivating factors for article citations rather than predicting them.

Difficulties in making accurate predictions are the sparseness of a citation network and that citation rates may have a degree of randomness. For example, a high impact journal paper may increase the citation rate of papers within the same issue. Previous empirical research predicted long-term citation counts from citations accumulated shortly after publication. For example, linear regression and citation count after 6 months have been used to predict citation counts after 30 months. In doing the analysis for the linear regression, author related information (i.e., the number of previous citations, publications, and co-authors for an author) was incorporated to improve predictions. Further, work has been done to use a regression model for predicting citation counts two years after publication using information available within three weeks of publication. The regression model used seventeen article-specific features and three journal specific features.

What is needed is a method and a computer system for predicting citation counts that is more reliable and predicts citation counts for long periods while only using information available at the time of publication of the article and that changes the article and publication technologies based upon the results computed by the system.

BRIEF SUMMARY OF THE INVENTION

The present invention meets the afore-described deficiencies. In one embodiment the present invention includes a computer system and a computerized process to predict citation counts of articles. The process comprises the steps of obtaining, through an input for receiving, an article and a selected set of articles exclusive of the article, storing in a memory the set of articles and the article and extracting through a processor an article feature from each article in the set of articles. The process also includes constructing, through said processor, models using a pattern recognition process and the article feature variable and selecting, through said processor, a best model. A predicting step occurs by the processor to apply the best model to the article to predict a future citation count of the article and the processor outputs the article comprising the future citation count. The output also can change the article's publication or distribution based on the future citation count.

In another embodiment, a computer system programmed to carry out a process to predict a future citation count of an article comprises an input device for receiving an article, a selected set of articles exclusive of the selected article, an author feature for each article of the set of articles and a bibliometric feature for each article in the set of articles. The computer system includes a memory for storing the article, the set of articles, the bibliometric feature, and the author feature and a processor that extracts an article feature from each article in said set of articles and constructs models using a pattern recognition process, the article feature, the author feature and the bibliometric feature. The processor is further configured to select a best model, and predict, using the best model, the future citation count for the article. The computer system further comprises an output device for outputting the article comprising the future citation count to a publication controller which in turn discriminates and publishes the article based upon the outputted computer results.

DETAILED DESCRIPTION OF THE INVENTION

In the following detailed description, reference is made to the accompanying drawings, which form a part hereof and show by way of illustration specific embodiments of the present invention. These embodiments are described in sufficient detail to enable those skilled in the art to practice them, and it is to be understood that other embodiments may be utilized, and that logical, and processing changes can be made.

Figure 1:
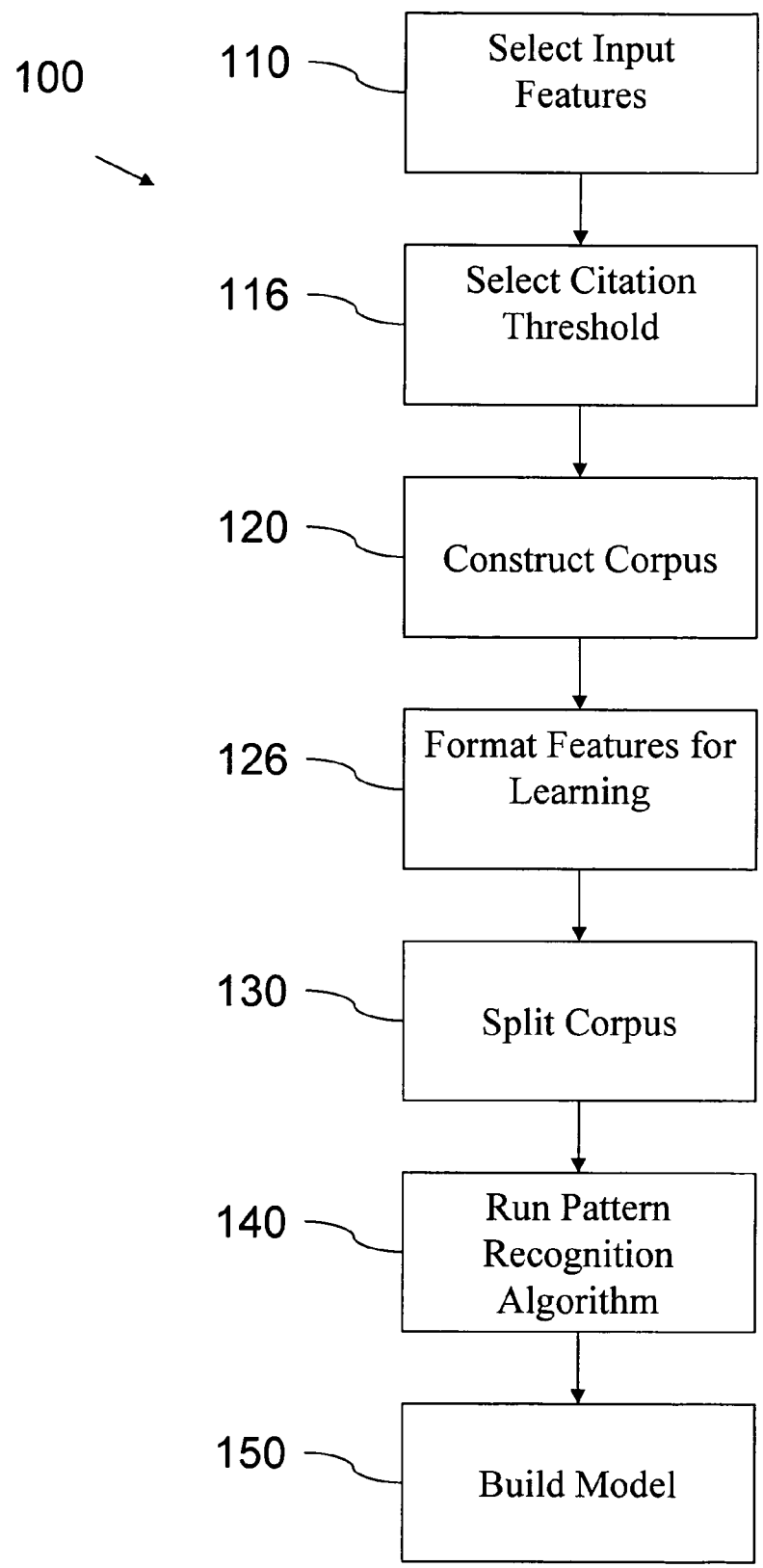
FIG. 1 illustrates a process to develop a model to predict the citation count of articles according to one embodiment.

FIG. 1 shows a process 100 implemented in a computer system (described in more detail in FIG. 6) for automatically generating a model that allows for predictions of future citation counts of articles. The process 100 includes the steps of: selecting input features 110, selecting a citation threshold 116, constructing a corpus 120, formatting articles for learning 126, splitting the corpus 30, training a pattern recognition process 140, and building a model 150.

The first step in the process 100 is to select input features 110. The features relate to information about the contents of the article. For example, the selected features are the content of the article's title or the article's abstract. In addition, the features can include the content of the body of the article. Further, features include terms associated with the article as provided by article databases such as MESH terms for the MEDLINE database. The features in the MESH terms in the MEDLINE database include the category of the article, terms of the article and whether or not there was federal funding for the project on which the article was written. Any one or combination of the above features can be selected, or none of the above features selected as inputs to create the model.

Additional features concerning the article to be selected by the computer processor in step 110. Information concerning the author of the article can be used by the processor in generating the model. While not all information about an author is relevant such as age or place of birth, information concerning the author's previous articles and current employment is focused as variables. For example, a variable is the number of articles written by the author. The number of written articles can be the total of all the author's articles or just the articles written in a certain time frame, such as during the ten years prior to publication of the article. In addition, a variable can be the number of citations that the author received for previous articles. The citations received is the total citations of all the author's articles or just the citations received in a certain time-frame such as the last ten years. Further, if the author is an academic, the quality of the author's institution according to the institution's ranking can be used as a feature. The ranking used in this embodiment was the Academic Ranking of World Universities although any other known ranking methodology can be used. If the article has more than one author, information about every author can be used as a selected input feature. However, information about every author does not have to be used. For example, information about only the first and last author can be used. In addition, certain classes of information about multiple authors can be used, while other classes of information use only information about a single author when information on multiple authors is not available.

Other features or variables used include bibliometric features. Bibliometric features can refer to any feature of an article not related to content or the authors. For example, a bibliometric feature is the type of publication in which the article was published. This publication type refers to whether an article is an article or review papers. For example, publication type could be letters to the editor or editorials. Type is identified from the record in the database, such as the Web of Science of the Institute of Scientific Information. Further, bibliometric features can include the impact factor of the journal in which the article was published. The impact factor of a journal, as known in the art, is a commercial product that rates journals based on received citations. Moreover, bibliometric data includes the number of authors that contributed to the article as well as the number of different institutions at which the authors work. Any one of the above bibliometric features or any combination of the above features or none of the above features can be selected as inputs during step 110.

Figure 6:
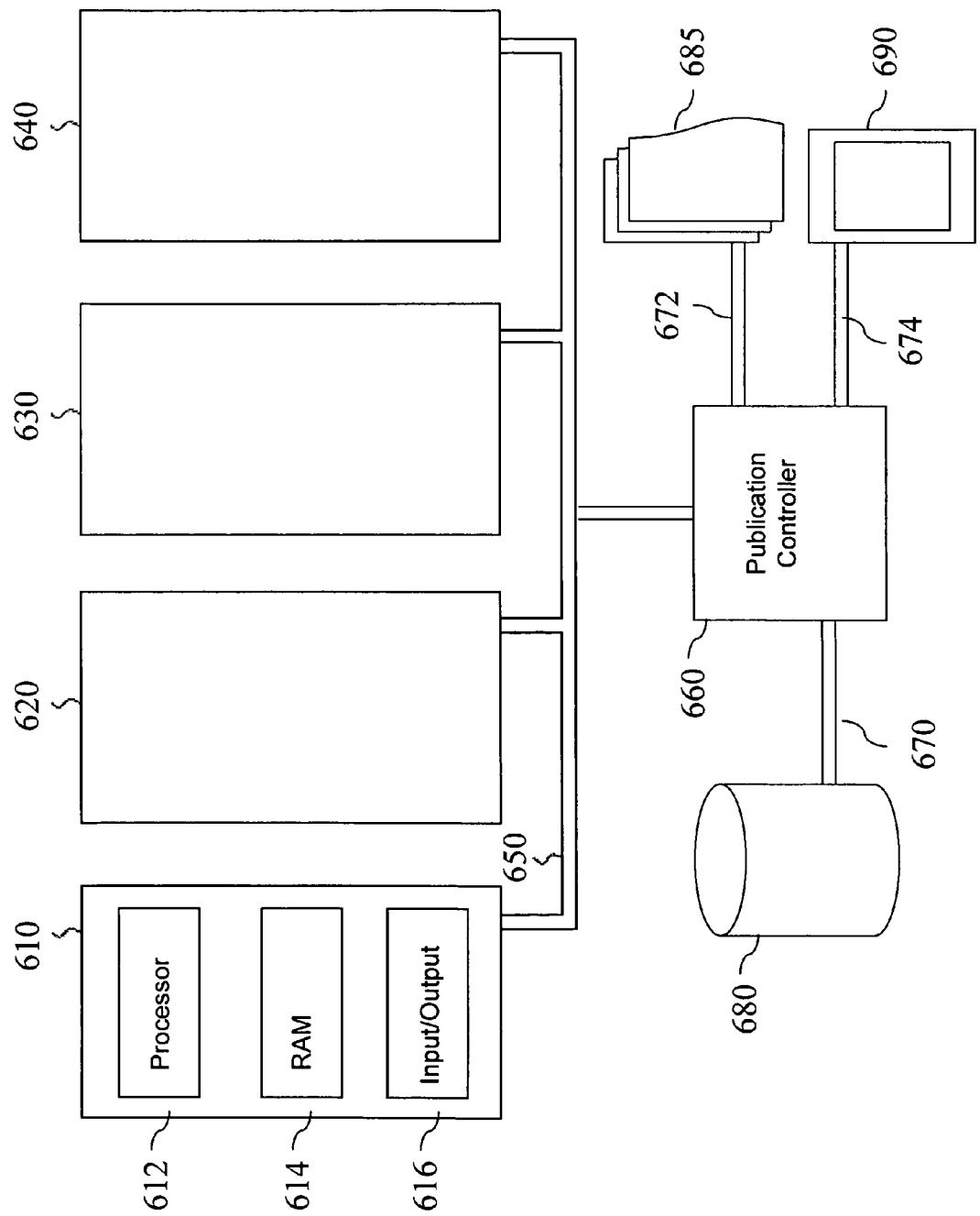
FIG. 6 illustrates the computer system used in the process in accordance with this invention.

In the present embodiment of the invention, article features, author's features, and bibliometric features are selected and used in the citation prediction process by the computer process of the system (illustrated in FIG. 6). Any one or combination of the above discussed features in any one of the three discussed categories may be used as the selected features for input in step 110. For example, the only features selected could be the bibliometric journal impact factor feature. The use of more features in most cases leads to a better ability to correctly predict the citation count of an article. In addition, an advantage of the described features is that all the features are available at the time that the article publishes. The process is not based on citations received by an article or other information that cannot be readily obtained at or before publication of the article.

The process 100 as described in FIG. 1 determines whether an article will receive a certain threshold number of citations. In step 116, the citation threshold is selected. Any number of citations may be selected for the threshold. For example, if a threshold of 100 citations is chosen, then the process will predict if an article will receive 100 or more citations or less than 100 citations. The process 100 does not predict an exact number of citations for an article, but answers a question of whether the article will receive as much as or more citations then the citation threshold as selected in step 116. The threshold number can be used as basis by, for example, the publisher to determine whether or not an article merits publication, distribution or review.

At step 120, the corpus is constructed by the system. The corpus is a set of articles and article information that are used by the pattern recognition process to build a model. The corpus can be composed of any articles. For the process 100 to more accurately predict citation counts, the articles should relate to the same general field as the article for which the citation count is to be predicted. However, the corpus articles do not have to belong to the same field as the article for which the citation count is to be predicted. In addition, for an accurate prediction of future citations at least a single article must have a citation count above the citation threshold selected in 116. The better the distribution of articles with citation counts above and below the citation threshold the more likely that the predicted future citations will be more accurate. Once the articles are selected, each article is given a positive or negative label. If the article's citation count exceeds the threshold it is given a positive label. If the citation count does not exceed the threshold the article is given a negative label.

Further, for the process 100 to produce accurate predictions the corpus should be sufficiently large. A small corpus would still allow the process 100 to predict a citation count; however the prediction will likely not be as accurate as a prediction developed using a process 100 having a larger number of articles in the corpus.

In step 126, the articles are formatted by the processor so that the pattern recognition process may use the articles and relevant article information as inputs. In one embodiment, the title, abstract and database words from MEDLINE are features that are extracted and then formatted. The features selected in step 110 of the articles are extracted. The features from the articles are then formatted by removal of stop words. Stop words are words such as "the," "a," "other," etc. that do not assist the pattern recognition process. Once all stop words are removed, the remaining words are stemmed. Stemming reduces words to their roots. For example the terms "randomly," "randomness," and "randomize" all describe a similar state yet each word would be recognized by a pattern recognition process as a different word. When the words are stemmed they are all reduced to the word "random." Thus, stemming increases the effective sample by encoding the term "random" three times rather than encoding the other three terms once. The Porter stemming algorithm is used to stem words, although other known stemming algorithms could be used.

The article features are further formatted to be numerical values to be used by the pattern recognition process. To format the features into numerical values, a log frequency with redundancy algorithm is used. The log frequency with redundancy algorithm weights words based on their usefulness to the pattern recognition process. Words that appear frequently in many articles are assumed to be less helpful than more selective words that appear in fewer articles. This weighting algorithm was chosen due to its superior performance when used with pattern recognition processes. Alternatively other weighting schemes known in the art can be used.

The rest of the features from the corpus articles must also be formatted to be used by the pattern recognition process. The bibliometric and author features are given a value from zero to one. The value given is a normalization of the value of the feature as compared to similar features from other articles in the corpus. To normalize the value of the feature, the lowest and highest value of the feature is determined in the corpus. The lowest value is normalized as zero and the highest as a one. The rest of the values are assigned corresponding values. For example, in the entire corpus if the lowest citation count for previous work by an author of an article was fifty and the highest was five hundred and fifty, then the article with a count of fifty would receive a zero for that feature and the article with the highest count would receive a one. Following the above example, if an article had a count that was two hundred and fifty, it would be normalized to one-half (0.5) and given that formatted value.

Once all the features of the articles have been formatted the features may be reduced. This reduction can be done by any number of reducing algorithms. These algorithms include, Markov Blanket, regularized learning models, univariate feature selection and wrapping methods.

Figure 3:
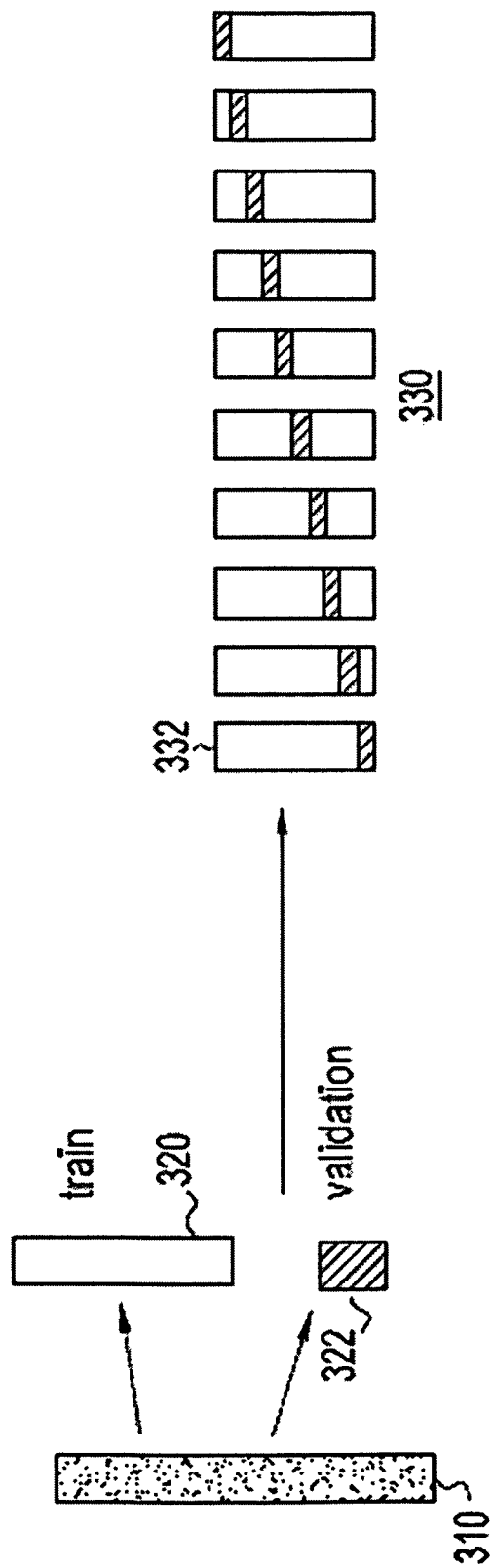
FIG. 3 illustrates how the splitting procedure operates according to one embodiment.

In step 130, the corpus is split by the processor. The splitting of the corpus process is described in FIG. 3. FIG. 3 shows a corpus 310, a training set 320, a validation set 322, an individual set 332 and sets 330. During step 130 the labeled corpus articles 310 are split into n-fold sets 330, where each individual set 332 is split into categories. Each individual set 332 contains all the corpus articles 310. The number n of the n-fold sets 330 is chosen based on the frequency of positive or negative labeled articles as determined during corpus construction in step 120. The choice for n should allow for sufficient articles from each category in each individual set 332. However, the number of sets used may range from 1 to the number of articles in the corpus 310. One embodiment of the procedure illustrated in FIG. 3 is one in which the corpus 310 is split into ten individual sets 332. The individual sets 332 are distinguished from one another according to which articles of the corpus 310 are placed in certain categories as illustrated in FIG. 3. The splitting procedure in step 130 is done to ensure that the filtering models selected are not a by-product of a particularly favorable or bad split of the articles.

The corpus articles 310 in an individual set 332 are further divided into two categories. The two categories are the training category 320 and the validation category 322. The union of the training category 320 and validation category 322 is the complete corpus 310 which form an individual set 332. Each category should contain approximately the same proportion of negative and positive articles as the entire corpus 310. The training category articles 320 are used to build filtering models, the validation category articles 322 are used to optimize specific parameters for the pattern recognition process that build the filtering models The articles from the validation category 322 from each set 332 are mutually exclusive of the articles of the validation category 322 in the nine remaining individual sets 332. As such, the union of the articles from the validation category 322 from each set 332 is all the corpus articles 310. For example if one-hundred corpus articles were made into ten sets, then each set 332 would have ten articles in their training category. One set 332 of the ten sets 330 would have articles 1-10 in its validation category 322, another set 332 of the ten sets 332 would have articles 11-20 in its validation category 322. The remaining articles would be divided into the remaining eight sets 332 as described above. Once articles are assigned to a validation category 322 in an individual set 332, the remaining articles are sent to the training category 320.

In step 140, the pattern recognition process is run by a processor. A pattern recognition process takes the formatted features of each article, and based on those features learns to distinguish between positively and negatively labeled articles. In essence the pattern recognition process learns what features an article needs to accumulate a citation count above the threshold and what features or lack of features would cause the article to not receive enough citations to reach the citation threshold. The pattern recognition process used by a processor in the exemplary embodiment is the Support Vector Machine (SVM) classification algorithm. The SVM calculates maximal margin hyperplane(s) separating two or more classes of data. The basic algorithm employed by the computer is reproduced below where K represents a kernel and C a penalty parameter:

$$\min_a \frac{1}{2} \sum_{i=1}^{m} \sum_{j=1}^{m} y_i y_j a_i a_j K(x_i, x_j) - \sum_{i=1}^{m} a_i \text{ where}$$

$$\sum_{i=1}^{l} y_i a_i = 0; C \geq a_i \geq 0; i = 1, \ldots, m$$

The SVM algorithm used in the computer was implemented in suitable computer code with a polynomial kernel. Other common kernels include but are not limited to RBF, two layer neural network kernels and other applicable kernels can be used in the SVM algorithm by the processor. The polynomial kernel used is reproduced below:

$$K(x_i, x_j) = (x_i \cdot g_i + 1)^d$$

Two parameters in the SVM algorithm need to be optimized for each corpus 310 that is being used to develop a filtering model. The parameters are the penalty parameter C and the degree d of the polynomial kernel. Before the parameters can be optimized, a finite range of parameters must be selected. In an exemplary embodiment, parameter C is construed over the range {0.1, 0.2, 0.4, 0.7, 0.9, 1, 5, 10, 20}. The degree d of the polynomial kernel is limited to the range {1, 2, 3, 4, 5, 8}. The ranges were selected based on previous research. Larger ranges can be used; however the larger range will increase the time required by the processor to generate a filtering model. The selection of parameters from a range allows for the SVM algorithm to be fine-tuned to allow for the best model to be developed based upon a corpus made in step 120. Because of the range of possible parameters, various combinations of the parameters C and d exist. Thus, each individual combination of the parameters is used to develop a model and then validated to determine the optimal combination for that corpus made in step 120.

Figure 4:
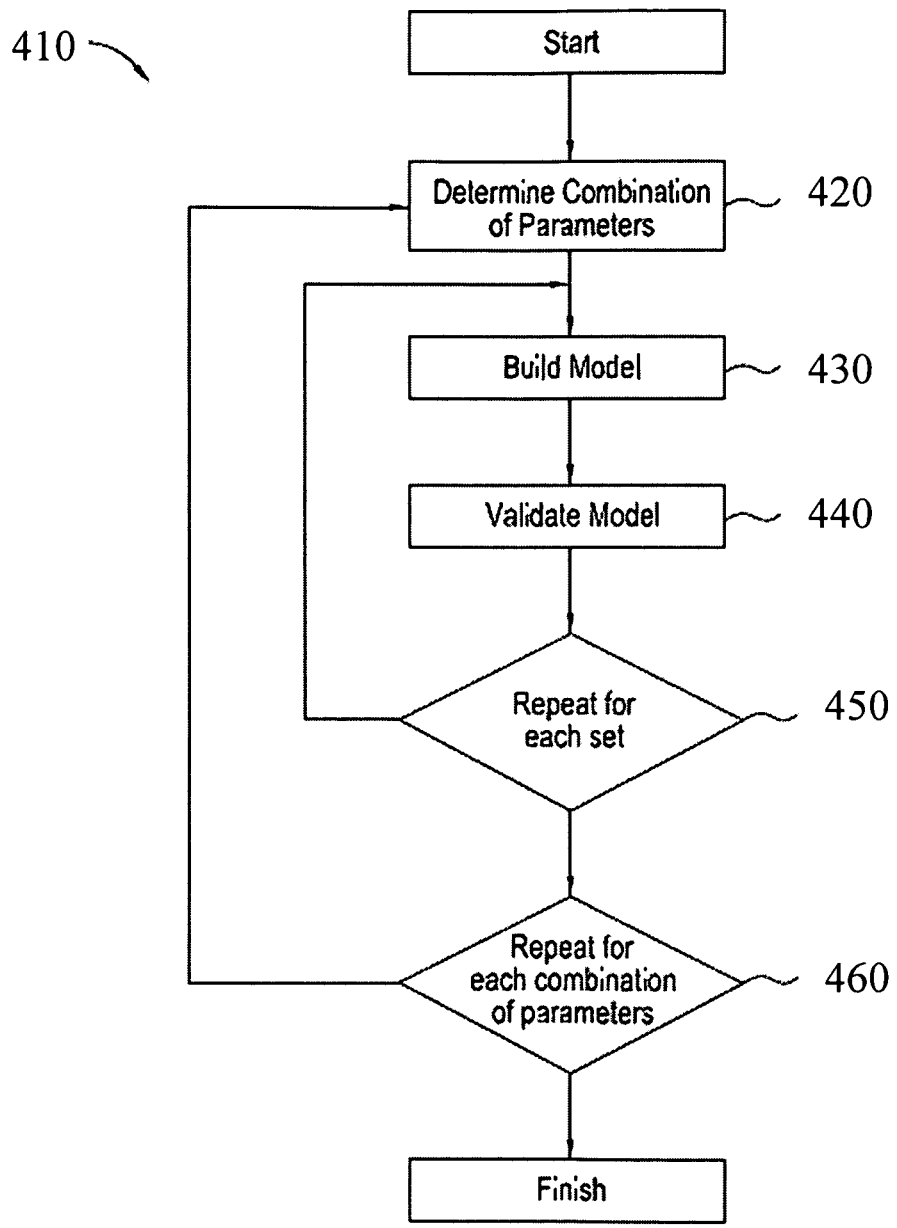
FIG. 4 illustrates a process used to optimize parameters of a pattern learning process according to one embodiment.

Referring now to FIG. 4, the process 410 is shown for selecting an optimal combination of parameters. A single combination of parameters C and d are selected in step 420. The SVM algorithm is then implemented with the combination of parameters. In step 430, the processor executes the algorithm and generates a filtering model using the training category 420 articles from a set 332. In step 440, the newly generated model from step 430 is validated by the processor using the validation category 322 articles from the same set 332 used in step 430. The performance of the model generated from the processed combination of parameters is recorded and stored in the memory (shown in FIG. 6). The performance is based on how many of the articles from the validation category 332 the model labels correctly. During step 450, steps 430 and 440 are then repeated on each of the individual sets 332 created during step 130. From the exemplary embodiment with ten different individual sets 332, steps 430 and 440 are repeated ten times. The recorded performance from each set 332 of the total sets 330 are averaged or combined for a composite performance measure for that combination of parameters. In step 460, the process of determining the composite performance measure for a combination of parameters is then repeated by the processor for each individual combination of parameters C and d. The combination of parameters with the highest composite performance is noted, and stored in memory.

In step 150, the optimal combination of parameters found in step 140 is used to build a final learning model. All of the articles are used by the pattern recognition process that is implemented with the optimized parameters found in step 140 to make a final model that will be used to accurately predict the future citation counts of articles.

Using the process described above when making a model helps to ensure that the model is sufficiently general to perform well on data that the model has not seen before. The output of the model produced is non-probabilistic. However, the output of a model developed according to the method described above can be converted to probabilities using standard probability fitting methods. Clustering methods can also further organize the results from the filtering models into coherent subgroups of articles; automatic identification of prominent keywords can characterize the contents of each automatically-created cluster. The above implementation could also be accomplished via bootstrapping, leave-one-out, or holdout methods.

Figure 2:
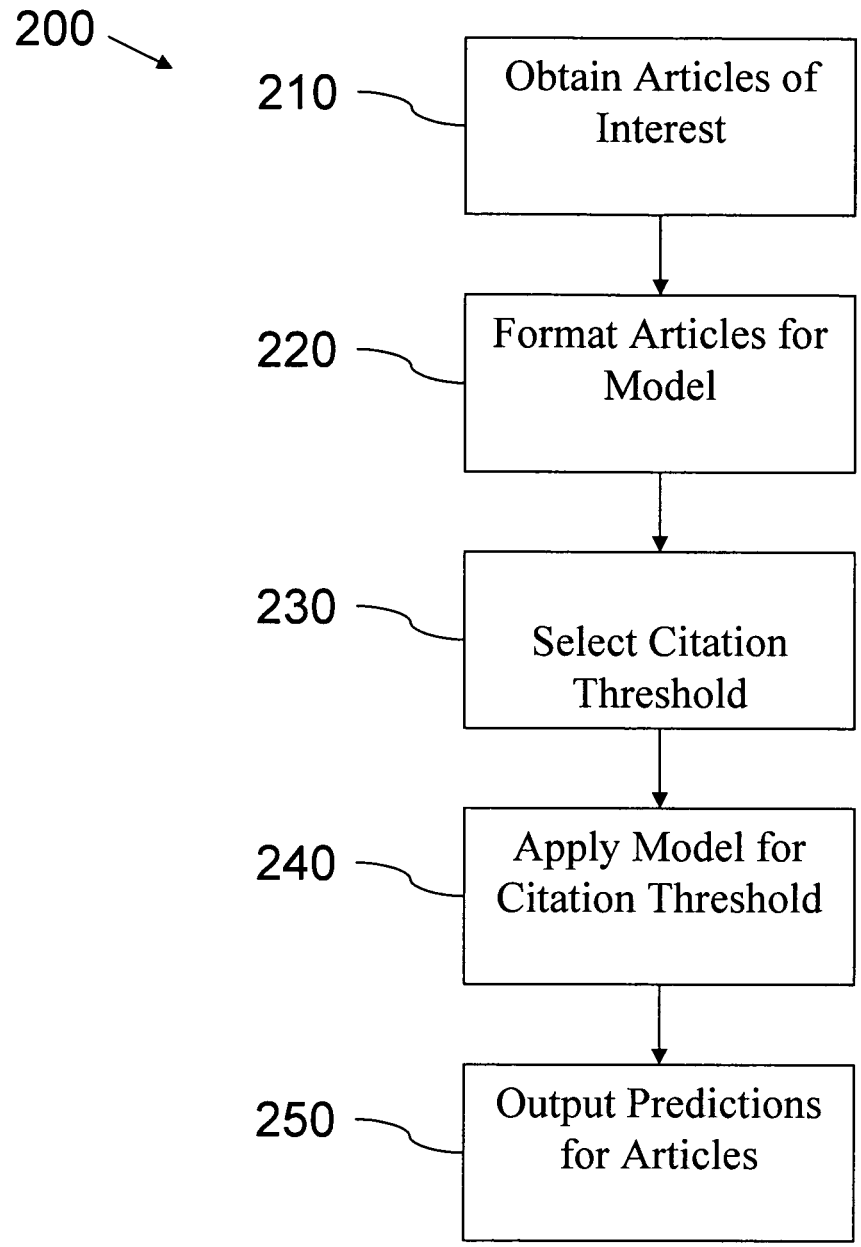
FIG. 2 illustrates a process to predict the citation count of articles according to one embodiment.

FIG. 2 is a process for using a model to determine a future citation count of an article of interest. The process 200 includes the steps of: obtaining the article of interest 210, formatting the article 220, selecting a citation threshold 230, applying a model with that threshold 240 and outputting the prediction 250.

In step 210, the article and article information of interest is obtained. In step 220, the features related to the article are formatted by a processor or input unit in the same manner that features were formatted in step 126. In step 230, the citation threshold is chosen by a user or by a device and inputted into the system for the article. The citation threshold is significant since the process 200 predicts whether or not the article will receive citations that equal or exceed the citation threshold or fail to receive the threshold number of citations. In step 240, a model is built by the processor or chosen from memory with the same citation threshold selected in step 230 and applied to the features of the article. In step 250, the model is then executed by the processor and the processor outputs a determination whether the article selected in step 210 will reach or exceed the threshold citation level selected in step 230 or fail to meet that citation threshold. The output is then, for example, applied to a connected external device such as a printer, or a server which published or distributes the article based upon it exceeding such threshold.

Using the process described in FIG. 2 to predict the number of future citations yields numerous advantages. The process described uses features that are available at or before the time of publication. Thus, the future citation count can be predicted before the article is published and does not rely on features collected after publication such as a short term citation count. Further, the process can predict citation counts for numerous time periods, depending on how the corpus is constructed. Citation counts over a longer period of time better indicate the importance of an article than citation counts accumulated over shorter time periods. In addition, using the process above the performance of the predictions as measured by area under the receiver operating characteristic curve (AUC) ranged from 0.86 to 0.92 depending on the threshold chosen. This is significant since an AUC of 0.85 indicates a very good prediction and an AUC above 0.9 indicates an excellent prediction.

Figure 5:
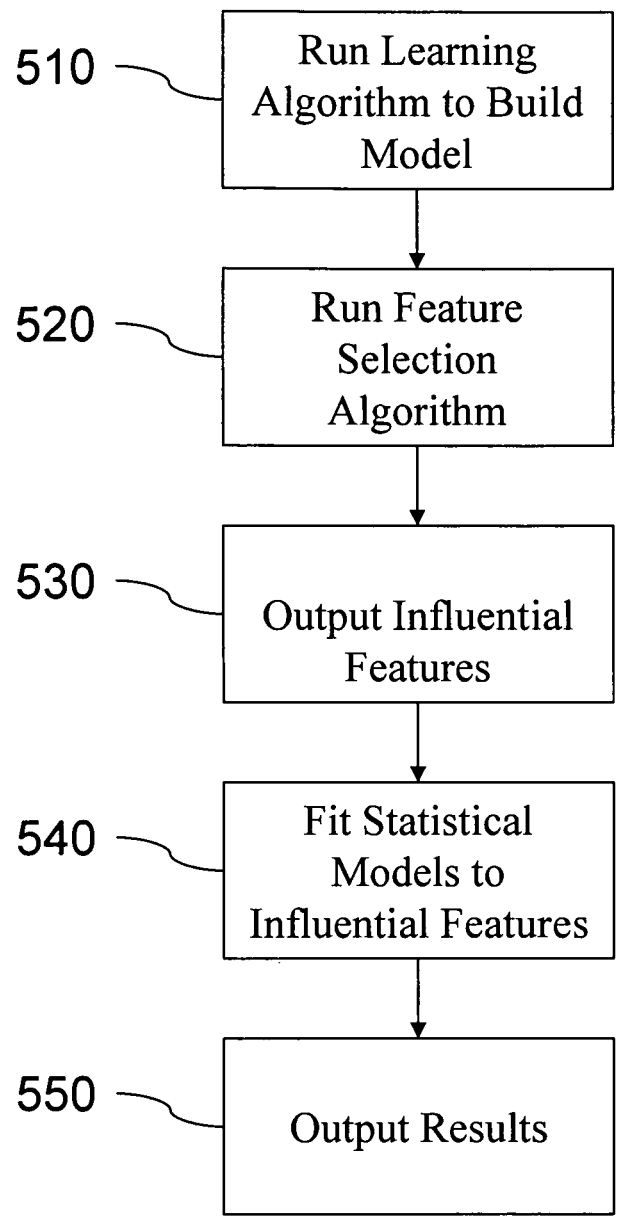
FIG. 5 illustrates a process to determine the influence of each feature used to predict the citation count of an article according to one embodiment.

FIG. 5 describes a process to determine which of the features used in process 200 described in FIG. 2 were the most influential. The process includes the steps of: using a processor to build a model with a learning process 510, running feature selection 520 through the processor, outputting influential features 530, fitting a statistical model on the influential features 540 and outputting the results 550 for application described in conjunction with FIG. 6.

In step 510, a process described in FIG. 1 to construct a model using features of selected articles is accomplished. During this step, a threshold citation count is determined by the processor. In step 520, a feature selection process, such as the Markov Blanket algorithm, is employed by the processor to reduce the features to those that were the most influential in making the predicted citation count. Other feature selection processes may be used by the computer such as regularized learning models, univariate feature selection and wrapping methods. In step 530, the influential features are outputted by the processor and stored. In step 540, the stored influential features are applied by the processor to a statistical model such as a logistical regression model. Other statistical models may be used. The statistical model then computes how much more likely having certain features in an article will lead to the article receiving a citation count above the threshold set in step 510. In step 550, the results of the statistical model are then outputted as previously described in FIG. 2.

As noted, exemplary processes for creating the filtering models are implemented as a collection of software programs that can be run automatically on computer hardware and on article production equipment, such as industry standard printers/printing processes. FIG. 6 shows hardware for generating the filtering models comprising computers 610, 620, 630, and 640, a processor 620, a memory 614, an input/output device 616, a network connection 650, a publication controller 660, first, second and third links 670, 672, and 674, a database 680, a printer or printing press 685 and a display 690.

In an embodiment, a single computer 610 is an example of hardware to generate the models. The computer 610 comprises a processor 612 and memory 614. The memory 614 must be large enough to handle the computations necessary to generate the models. The input/output 616 receives information and sends information.

In another embodiment the models are generated with a cluster of computers comprising computers 610, 620, 630, and 640. Each computer has a processor 612 and memory 614. In an exemplary embodiment each computer 610, 620, 630, and 640 has 4 GB of RAM memory 614 and a Pentium 4 processor 612. The computer cluster is connected together by a network connection 650 and each computer 610, 620, 630, and 640 is running Linux.

In another embodiment, the process is contained in the memory 614 and runs on the processor 612. In another embodiment, the process described above is on a computer readable medium and runs on the processor 612. In another embodiment, the process runs on any one of the single computers 610, 620, 630, 640 or combination thereof. The models can also be generated on a field programmable gate array or other various hardware systems.

In another embodiment, the process is contained in the memory 614 and runs on the processor 612 in the computer 610. The processor 612 takes an input of an article and information concerning the article and stores the article in the memory 614. The processor then performs the process as described in an embodiment to produce an article with a predicted citation count. The computer then outputs the article with the predicted citation count by way of the input/output 616. The article with the predicted citation count is a more practical tool for evaluating the quality and impact of the recent article, its authors and subject because no wait is required to determine citation counts. To evaluate an article without the predicted citation requires time for citations to be accumulated to be used as a basis for evaluation. Thus, an article with a predicted citation count can more easily be evaluated and is more likely to be published since the predicted success of the article is known.

In another embodiment, the process is contained in the memory 614 and runs on the processor 612 in the computer 610. The processor 612 takes an input of an article and information concerning the article and stores the article in the memory 614. The processor then performs the process as described in an embodiment to produce an article with a predicted citation count. The article with the predicted citation count is sent to computer 620 through the network connection 650. Computer 620 determines if the article with the predicted citation count should be published based partially on the predicted citation count and other factors. If the article with the predicted citation count is to be published, the computer 620 sends the article to be published. If the article is not to be published the computer 620 sends a rejection of publication. Thus, an article with a sufficient predicted citation count is published.

Various devices are controlled through publication controller 660 that use the output of computer 610 or computers 610, 620, 630 and 640. The controller 660 is connected to the computers 610, 620, 630 and 640 through network connection 650. Further the controller 660 is connected to a database 680 through a first link 670, a printer or printing press 685 through a second link 672, and a display 690 through a third link 674. The controller 660 takes the output, the stored article with a predicted citation count above the threshold, from the computer 610 or computers 610, 620, 630 and 640. The article is then, in turn, sent by the controller 660 to the printer 685 through link 672 to be printed as a hard copy. Alternatively, the approved article can be sent via the first link 670 to another device, such as a publication database 685. The database 685 can, in turn, be connected to standard publishing equipment, such as a printing press. Alternatively, the approved article, threshold, model or other processed information, referenced above, can be sent by controller 660, through the third link 674 to display 690 for display to an end user.

The above description and drawings illustrate preferred embodiments which achieve the objects, features, and advantages of the present invention. Although certain advantages and preferred embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

The invention claimed is:

1. A computer-based process utilizing a specifically programmed computer to predict before, at, or after the time of publication the likely number of citations articles will receive over time comprising the steps of:
    a) receiving a selected article through an input along with relevant article information related to the selected article;
    b) obtaining, through the input, a set of articles along with relevant article information related to the set of articles related to the same general field as the selected article but exclusive of the selected article;
    c) storing in a memory the set of articles and the selected article;
    d) extracting and formatting through a computer processor, features from each article in the set of articles, the selected article, relevant article information related to the set of articles, and relevant article information related to the selected article, to enable a pattern recognition process to use the articles and relevant article information as inputs, wherein the relevant article information related to the selected article uses only features that are available before or at the time of publication of the selected article;
    e) from each article in the stored set of articles;
    1) constructing models through the computer processor employing feature reduction and a pattern recognition process and the extracted article features; and
    2) selecting, through the processor, a best model;
    f) predicting by application of the best model to the selected article by the processor future citation counts for the selected article; and
    g) outputting, the selected article along with its predicted future citation counts.

2. A computer-based process according to claim 1 wherein the extracted and formatted features comprise at least one article feature term of: an abstract, a title, a body, and a database identifier.

3. The process according to claim 2 wherein as an additional article feature Medical Subject Heading (MESH) terms are used if they are available for biomedical articles.

4. A computer-based process according to claim 1 wherein the extracted and formatted features comprise at least one author feature of: a number of citations received by at least one author for articles other than the selected article, a number of previous articles by at least one author, and the quality/ranking of at least one author's institution in comparison to other institutions.

5. A computer-based process according to claim 1, wherein the extracted and formatted features comprise at least one bibliometric feature of: a journal impact factor, a publication type, a set of authors, and a set of institutions.

6. The process according to claim 1 wherein the distribution of the selected article is controlled through a publication controller unit.

7. The computer-based process of claim 1 in which the pattern recognition process is the Support Vector Machine algorithm.

8. The computer-based process of claim 1 in which nested cross validation is used to select the best model.

9. The computer based process of claim 1 in which the formatted features further comprise:
    a) at least one author feature of: a number of citations received by at least one author for articles other than the selected article, a number of previous articles by at least one author, and the quality/ranking of at least one author's institution in comparison to other institutions; and b) at least one article feature of: an abstract, a title, a body, and a database identifier; and c) at least one bibliometric feature of: a journal impact factor, a publication type, a set of authors, and a set of institutions.

10. The computer-based process according to claim 1, wherein the step of extracting includes extracting additional citations available after the time of publication.

11. A computer system for predicting a citation count of an article before or at the time of publication and controlling publication based on said prediction comprising:

a) an input device for receiving information regarding articles;

b) a memory for storing the information regarding articles;

c) a processor configured to:

1) receive a selected article through an input along with relevant article information related to the selected article;

2) obtain, through the input, a set of articles along with relevant article information related to the set of articles related to the same general field as the selected article but exclusive of the selected article;

3) store in a memory the set of articles and the selected article;

4) extract and format features from each article in the stored set of articles, the selected article, relevant article information related to the selected article, and relevant article information related to the set of articles, to enable a pattern recognition process to use the articles and relevant article information as inputs, wherein the relevant article information related to the selected article uses only features that are available before or at the time of publication of the selected article;

5) use each article in the stored set of articles to construct models employing feature reduction and a pattern recognition process and the extracted article features; and to select a best model;

6) predict by application of the best model to the selected article future citation counts for the selected article;

d) an output device for outputting the selected article along with its predicted citation counts;

e) a publication controller to control the distribution of the selected article.

12. A computer system according to claim 11, wherein the extracted and formatted features comprise at least one bibliometric feature of: a journal impact factor, a publication type, a set of authors, and a set of institutions.

13. A computer system according to claim 11, wherein the extracted and formatted features comprise at least one author feature of: a number of received citations of at least one author for articles other than the selected article, a number of articles by at least one author, and a quality/ranking of at least one author's institution in comparison to other institutions.

14. A computer system according to claim 11, wherein the extracted and formatted features comprise at least one article feature term of: an abstract, a title, a body, and a database identifier.

15. The system according to claim 14 wherein as an additional article feature Medical Subject Heading (MESH) terms are used if they are available for biomedical articles.

16. The computer system of claim 11 in which the pattern recognition process is the Support Vector Machine algorithm.

17. The computer system of claim 11 in which nested cross validation is used to select the best model.

18. The computer system of claim 11 in which the formatted features further comprise:

a) at least one author feature of: a number of citations received by at least one author for articles other than the selected article, a number of previous articles by at least one author, and the quality/ranking of at least one author's institution in comparison to other institutions; and b) at least one article feature of: an abstract, a title, a body, and a database identifier; and c) at least one bibliometric feature of: a journal impact factor, a publication type, a set of authors, and a set of institutions.

19. The computer system of claim 11, wherein the step of extracting includes extracting additional citations available after the time of publication.

20. A non-transitory computer readable storage medium containing a program for operating a computer for predicting before, at, or after the time of publication the likely number of citations articles will receive over time, the program causing the computer to perform acts comprising:

a) receiving a selected article through an input along with relevant article information related to the selected article;

b) obtaining, through an input, a set of articles along with relevant article information related to the set of articles related to the same general field as the selected article but exclusive of the selected article;

c) storing in a memory the set of articles and the selected article;

d) extracting and formatting through a computer processor features from each article in the stored set of articles, the selected article, relevant article information related to the set of articles, and relevant article information related to the selected article, to enable a pattern recognition process to use the articles and relevant article information as inputs, wherein the relevant article information related to the selected article uses only features that are available before or at the time of publication of the selected article;

e) from each article in the stored set of articles;

1) constructing models through a computer processor employing feature reduction and a pattern recognition process and the extracted article features; and 2) selecting, through the processor, a best model;

f) predicting by application of the best model to the selected article by the processor future citation counts for the selected article; and g) outputting the selected article along with its predicted future citation counts.

21. A non-transitory computer readable storage medium according to claim 20, wherein the extracted and formatted features comprise at least one author feature of: a number of received citations of at least one author for articles other than the selected article, a number of articles by at least one author, and a quality/ranking of at least one author's institution in comparison to other institutions.

22. A non-transitory computer readable storage medium according to claim 20, wherein the extracted and formatted features comprises at least one article feature term of: an abstract, a title, a body, and a database identifier.

23. The non-transitory computer readable storage medium according to claim 22 wherein as an additional article feature Medical Subject Heading (MESH) terms are used if they are available for biomedical articles.

24. A non-transitory computer readable storage medium according to claim 20, wherein the extracted and formatted features comprise at least one bibliometric feature of: a journal impact factor, a publication type, a set of authors, and a set of institutions.

25. The non-transitory computer readable storage medium of claim 20 in which the pattern recognition process is the Support Vector Machine algorithm.

26. The non-transitory computer readable storage medium of claim 20 in which nested cross validation is used to select the best model.

27. The non-transitory computer readable storage medium according to claim 20 in which the formatted features further comprise:
   a) at least one author feature of: a number of citations received by at least one author for articles other than the selected article, a number of previous articles by at least one author, and the quality/ranking of at least one author's institution in comparison to other institutions; and
   b) at least one article feature of: an abstract, a title, a body, and a database identifier; and
   c) at least one bibliometric feature of: a journal impact factor, a publication type, a set of authors, and a set of institutions.

28. The non-transitory computer readable storage medium according to claim 20, wherein the step of extracting includes extracting additional citations available after the time of publication.

* * * * *